United States Patent

Pinone

[11] Patent Number: 5,419,238
[45] Date of Patent: May 30, 1995

[54] POPCORN DISPENSING MACHINE
[75] Inventor: Anthony J. Pinone, Boca Raton, Fla.
[73] Assignee: Show-Pop International, Inc., Boca Raton, Fla.
[21] Appl. No.: 107,215
[22] Filed: Aug. 16, 1993

Related U.S. Application Data

[63] Continuation-in-part of Ser. No. 27,295, Mar. 8, 1993, Pat. No. 5,309,825.

[51] Int. Cl.$^6$ .............................................. A23L 1/18
[52] U.S. Cl. .................................. 99/323.6; 99/323.7; 99/323.8; 99/323.9
[58] Field of Search .................. 99/323.5–323.11, 99/357, 476, 356; 221/150 A, 150 HC, 150 R, 125; 426/450

[56] References Cited

U.S. PATENT DOCUMENTS

| | | | |
|---|---|---|---|
| 1,436,400 | 11/1922 | Mabey | 99/323.11 |
| 2,771,863 | 11/1956 | Denehie et al. | 99/323.7 |
| 3,253,532 | 5/1966 | Jones | 99/323.7 |
| 3,254,800 | 6/1966 | Baunach | 99/323.9 |
| 3,973,045 | 8/1976 | Brandberg et al. | |
| 4,171,667 | 10/1979 | Miller et al. | 99/323.6 |
| 4,292,332 | 9/1981 | McHam | |
| 4,307,657 | 12/1981 | Avery | |
| 4,553,010 | 11/1985 | Bohrer et al. | |
| 4,727,798 | 3/1988 | Nakamura | |
| 4,861,958 | 8/1989 | Bohrer et al. | |
| 4,947,740 | 8/1990 | Strawser et al. | |
| 4,980,529 | 12/1990 | Bolton | |
| 5,018,615 | 6/1991 | Byrley | |
| 5,035,173 | 7/1991 | Stein et al. | |
| 5,064,981 | 11/1991 | Bolton | |

FOREIGN PATENT DOCUMENTS

21861809  2/1987  United Kingdom .

Primary Examiner—Timothy F. Simone
Attorney, Agent, or Firm—Malin, Haley, DiMaggio & Crosby

[57] ABSTRACT

A popcorn machine (10) for measuring a metered amount of popcorn, cooking the popcorn fresh in the machine, and dispensing the freshly cooked popcorn into a manually positioned cup (3a) in the front of the machine. The machine includes a sealed, slidable dispensing mechanism (46) that keeps the popcorn fresh at all times in its uncooked kernel reservoir (22), preventing moisture from escaping. The device also includes at least one optional liquid flavoring dispenser (68) that allows for uniform distribution of liquid flavorings on top of the freshly cooked popcorn.

12 Claims, 6 Drawing Sheets

POPCORN DISPENSING MACHINE

This application is a continuation-in-part of application Ser. No. 08/027,295, filed Mar. 8, 1993, now U.S. Pat. No. 5,309,825.

BACKGROUND OF THE INVENTION

1. Field of the Invention

This invention relates generally to a popcorn dispensing machine, and specifically, to a push button actuated popcorn dispensing machine which cooks uncooked kernels of corn which are stored in the machine. The corn is dispensed in premeasured quantities in response to either a coin or paper moneyactuated vending mechanism, or standard push-button switch. The machine also allows for a uniform distribution of a cheese or other flavored topping to be optionally administered.

2. Description of the Prior Art

Popcorn vending and dispensing machines are known in the prior art. Originally, machines were utilized that dispensed already popped corn that was typically heated by lamps in premeasured amounts into bags or other typical containers. Recently, vending machines have been displayed that allow for various types of cooking of the popcorn at the time the materials are vended and actuated by the vending machine. U.S. Pat. No. 4,947,740, issued to Strawser et al., discloses an individual serving popcorn machine operable on demand. U.S. Pat. No. 3,882,255, issued to Gorham, Jr. et al., discloses a method for preparing popcorn containing no cooking oil residue and flavored with one or more selected flavorings. U.S. Pat. No. 4,727,798, issued to Nakamura, discloses a popcorn processing machine which is capable of heating and popping uncooked corn rapidly, without addition of oil. U.S. Pat. No. 5,035,173, issued to Stein et al., discloses an apparatus for the automatic continuous popping of popcorn in large quantity. One of the drawbacks of conventional popcorn vending machines is that the uncooked corn sitting in the vending machine awaiting cooking can become dried out. This results in stale corn being utilized, diminishing from its flavor and further resulting in unpopped kernels. Another drawback in present day dispensing and vending machines is that it is often desirable to provide additional flavors on the freshly popped popcorn which heretofore have not been available at the vending site.

The present invention overcomes these problems by providing a relatively simple, but very efficient popcorn dispensing machine which keeps the uncooked corn in a fresh state at all times so that at the moment of cooking, the popcorn is fresh, with the uncooked corn retaining its moisture as necessary in a sealed storage unit. Another improvement provided by the present invention is that it provides for uniform distribution of additional flavored toppings such as liquid cheese to be applied directly to the freshly popped corn at each dispensing cycle at the user's option.

Finally, another advantage of the present invention is that it is easy to operate in terms of restocking the flavored toppings, restocking the uncooked corn, and retrieving the monies obtained from the machine.

Several U.S. patents show a variety of types of vending machines and vending popcorn machines, none of which teach Applicant's invention.

SUMMARY OF THE INVENTION

A popcorn cooking and dispensing machine that may be operated either in accordance with a vending actuating mechanism that receives paper money, coins or through the use of an ordinary switch mechanism. It comprises a hot air blowing cooking unit, a sealed storage container that contains the uncooked corn, a storage cup for retrieving the cooked popcorn, a turntable for supporting the storage cup, and a power unit. The power unit includes an electrical power supply and circuitry which provides electrical energy to the cooking unit, turntable, and a pump that allows for pumping at least one selected liquid flavor into a predesignated area for distribution on the cooked corn.

The actuating mechanism, which typically is a dispensing slide or vending actuating mechanism, provides mechanical linear motion to a specially developed dispensing unit that is attached at one side to the outlet of the uncooked corn chamber and to its opposite side to a chute that administers the popcorn into the popcorn cooker. In one embodiment, the dispensing slide includes a measuring cylinder that is sized to receive an exact amount of uncooked corn necessary for the proper serving to be cooked. A slidable chamber seals the corn storage area to prevent loss of moisture when in the non-distributing position. The measured amount of corn is then moved through the slide mechanism to the corn distribution chute into the cooker. By allowing the corn to be sealed in the non-activating position, no moisture will leave the corn chamber so the popcorn remains fresh at all times. In an alternative embodiment, the measuring cylinder may be substantially square or triangular in cross section, and can be moved manually into position or driven by a motorized screw mechanism.

Additionally, the actuating mechanism may be comprised of a revolving disc with one or more chambers which fill up, measuring an amount of corn from the sealed reservoir, and which are carried to the chute. The corn is released from the corn distribution chute into the cooker.

The popcorn dispensing machine in accordance with the present invention also includes one or more liquid pumps, a switching mechanism, one or more liquid reservoirs that contain liquid cheese or other flavored toppings which can be administered to the cooked popcorn. Respective inlet lines from each flavor reservoir, and corresponding outlet lines for the liquid flavoring terminate with a respective outlet opening juxtapositioned above the receiving cup chamber. The receiving cup chamber includes a skirted turntable so that the liquid flavoring outlet openings can dispense flavorings that fall, by gravity, onto rotating cooked popcorn kernels at the top of the cup. Rotation of the turntable insures adequate distribution of the liquid flavoring and prevents the customer from prematurely removing the cup. The liquid flow of the cheese or other selected flavoring can begin either during the cooking process, or after the cup is completely filled. Thus, the liquid distribution can begin so that the flavored liquid is distributed throughout the corn while popping, or after the cup is filled with the cooked popcorn.

The actuation of the liquid cheese or selected flavoring is automatic in that the operator of the dispensing machine selecting the popcorn, can depress a manual switch built into the vending machine equipment, stopping the activation of a timer circuit. This prevents any flavor from being dispersed on the popcorn. In an alternative embodiment, the switch may turn on the pump, activating the liquid flavoring pump, if the operator elects to receive flavoring on the popcorn. Normally, if this switch is not actuated, the pump will be automatically activated to add flavoring.

The uncooked corn receiving chamber or reservoir is mounted at the top of the machine, preferably in a clear or transparent acrylic chamber so that one can readily tell how much popcorn (uncooked) remains in the reservoir. A lockable sealed door at the top of the chamber will allow access for refilling uncooked corn into the receiving chamber. The bottom of the chamber includes a circular conduit and outlet that allows the corn to fill the conduit by gravity. The sidewalls near the base of the chamber may be tapered so that the last bit of uncooked corn will fall by gravity into the bottom cylindrical outlet.

In a first embodiment, the popcorn dispenser slide tray includes an outer rectangular wall having a circular hole that fits adjacent to and snugly into the cylindrical outlet of the dispenser chamber. On its top surface, a predetermined distance away, a bottom circular hole connects to a corn chute that diverts corn to the cooker. Inside of the slide tray, a second rectangular wall has top and bottom circular holes which are sized to coincide with the upper circular aperture. These holes connect to the uncooked corn dispensing chamber outlet and the corn chute, respectively, and a cylindrical, manually movable chamber. The inside cylindrical slide chamber, contains a pre-measured cylindrical volume which aligns both with the outlet from the dispenser and, when moved linearly, to the chute.

Optionally, the dispensing chamber may be connected to a vending apparatus. When the vending apparatus is used, the proper coin or paper money is first inserted. The device is then electrically or manually activated. A linear motion is provided moving the corn dispensing slide from a first position, in direct communication with the corn reservoir, to a second position where the corn drops by gravity into the chute. When the unit is restored to the first position, the corn is sealed so that no moisture can get out of the cylindrical chamber, keeping the corn in a fresh condition. Each time the vending apparatus is actuated, only a predetermined amount of uncooked corn is transferred to the chute. This insures that each time the cooker receives a pre-measured amount of corn kernels for cooking.

Access to both the reservoir containing the liquid flavoring and money reservoir receiving coins or paper money is through the front located door and includes a lock so unauthorized access is not permitted. Mounted on one side of the unit is an opening or chamber that has a turntable on its floor portion and a motor for turning the turntable. The motor is actuated when the vending apparatus is turned on. This rotates a cup, placed on the turntable, which receives the popped corn.

The housing unit, may be substantially rectangular, and is sized for mounting on a countertop. The housing includes one or more circular chambers which hold cups in an inverted position so they are available to an operator for use in the device.

In order to operate the device, a user would step forward and place a paper cup, received from the top of the housing, into the opening in the front of the housing. Preferably this opening is on the right hand side of the housing and contains the turntable onto which the cup is placed. When the optional vending apparatus is used, paper money or coins are then placed into the apparatus, which then actuates the slide tray mechanically or electrically. The corn can then be moved using the slide tray or dispenser into the corn chute. This dispenser drops the prescribed amount into the cooker. Electrical power is provided to heat or cook the hot air blower in the corn popper. A cooking fan may also be used to blow hot air out through the side of the unit if desired. As the corn is popped, an angled deflection shield at the top of the cooker directs the popped corn into the cup receiving chamber. The corn bounces off the shield and is diverted into the rotating cup. This cooking process continues, until all of the corn is cooked and the cup becomes filled with popcorn.

If the operator desires to also have a liquid flavored topping, such as liquid cheese, the operator does nothing, since flavoring will be dispersed automatically. In an alternative embodiment, the operator may depress a manual button on the front of the device, turning off power to the pump. Liquid flavoring will not be transferred from its respective reservoir tube, through the pump and onto the popcorn. Upon completion of any liquid flavoring which may transfer, the turntable stops and the operator can remove the cup of popped corn containing the liquid flavoring.

The dispensing machine will return to its initial starting position which subsequently causes the corn measuring and dispensing slide to return to its initial position. This seals the corn from the surrounding atmosphere, preventing any moisture loss, thereby keeping the corn fresh in its storage chamber.

An owner or maintenance person can gain access to the machine through a key lock on the front door. The door may be opened to replace liquid flavoring or change containers. If the optional vending mechanism is used, monies received into the small compartment can be retrieved through the lockable door. Corn kernels are added through the lockable upper top door in the corn storage chamber.

The unit is powered by conventional 120 volt AC power through a power cord connected to power distribution circuitry. Electrical power is supplied to the cooking unit's electrical heating coils, one or more fan units that can be used to cool the heating unit and distribute the smell of fresh popcorn, the liquid flavoring pumps, vending apparatus, lighting equipment, and turntable.

It is an object of this invention to provide an improved popcorn cooking machine particularly useful for vending.

It is another object of this invention to provide an improved popcorn cooking and dispensing machine that includes the ability to distribute liquid flavoring to freshly cooked popcorn.

And yet still another object of this invention is to provide a compact popcorn machine that cooks fresh popcorn in pre-measured amounts and provides a liquid flavoring with little mess and waste.

And yet still another object of this invention is to provide a popcorn machine wherein the uncooked kernels remain in a fresh state in a separate reservoir preventing moisture from leaving the corn in its uncooked state.

In accordance with these and other objects which will become apparent hereinafter, the instant invention will now be described with particular reference to the accompanying drawings.

DESCRIPTION OF THE PREFERRED EMBODIMENTS

Figure 1:
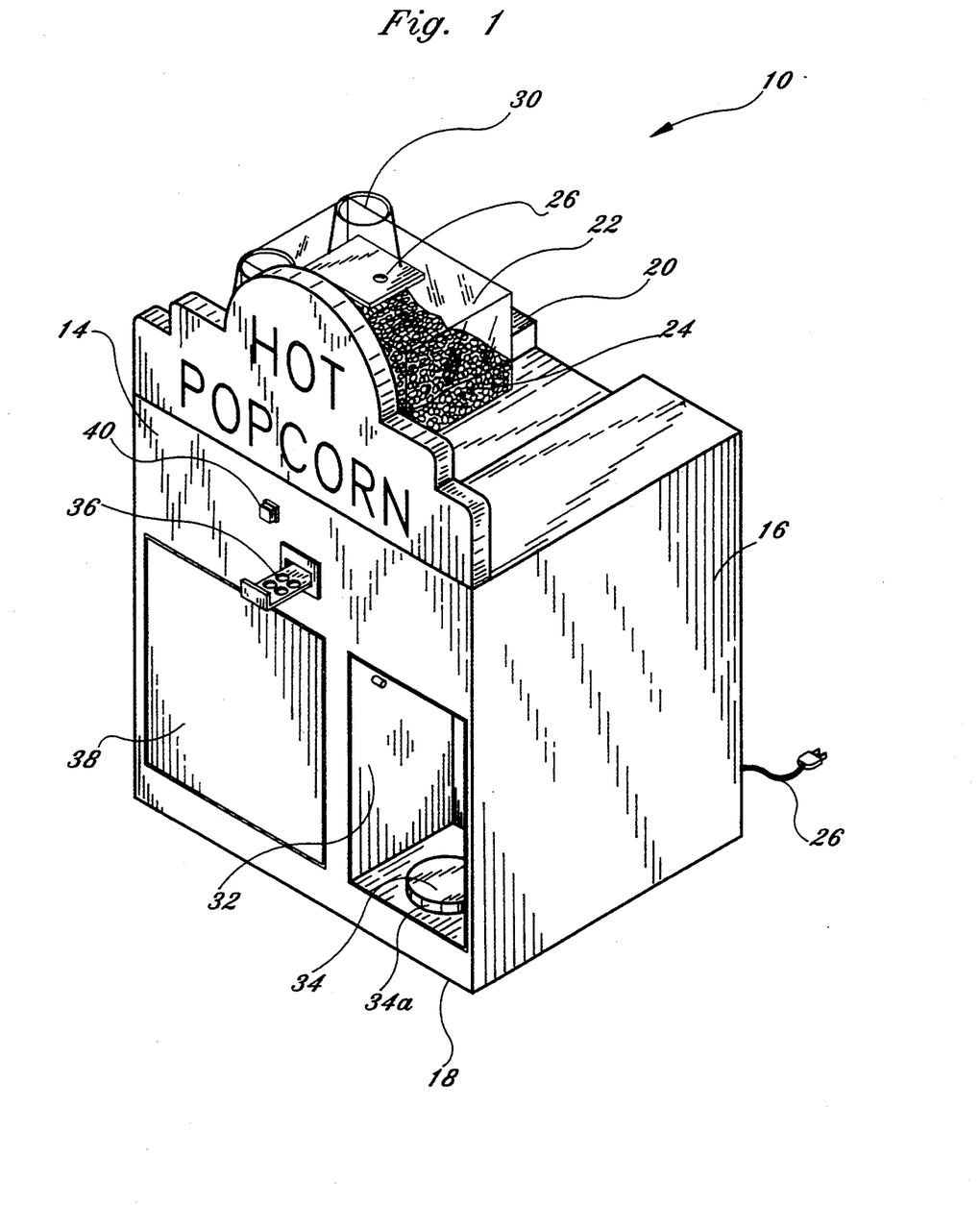
FIG. 1 shows a perspective view of the present invention.
Figure 2:
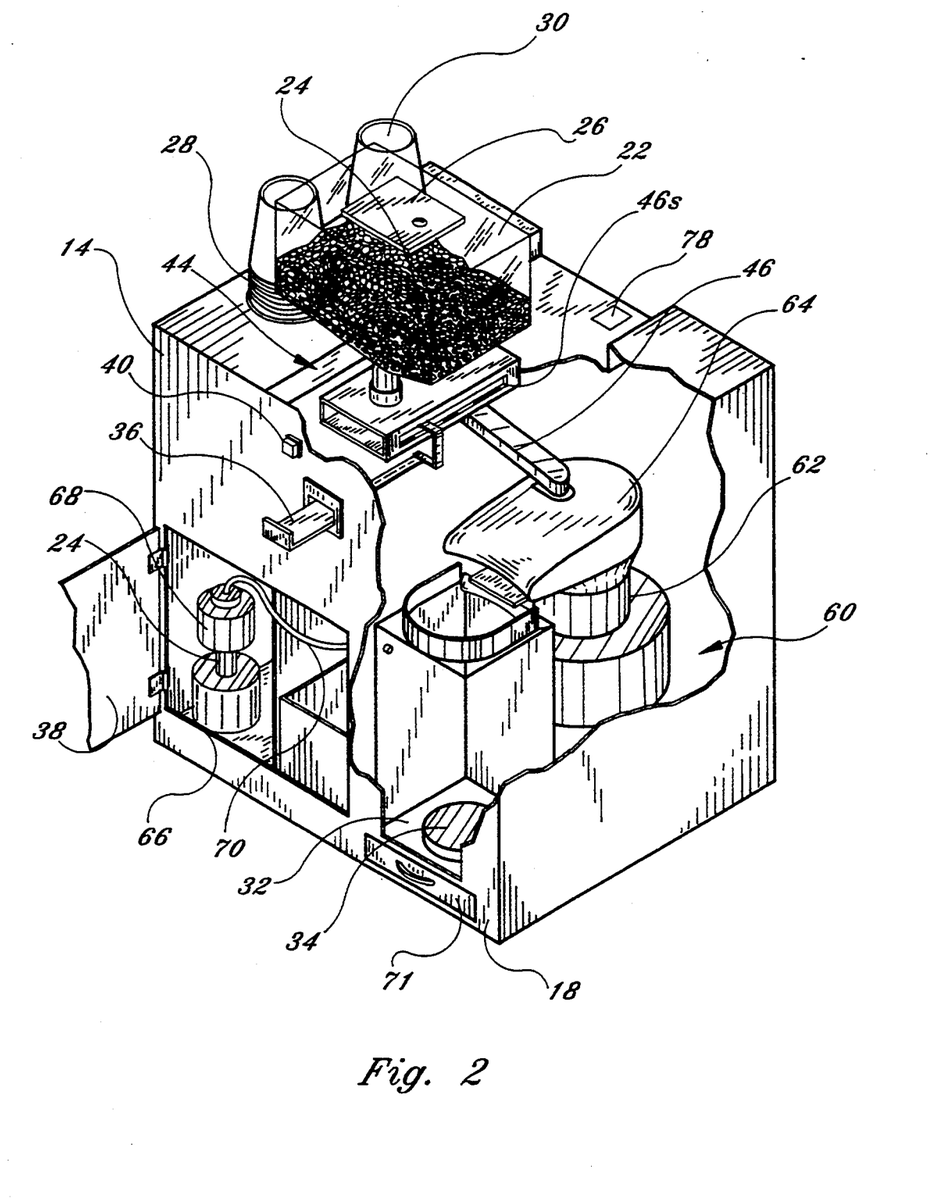
FIG. 2 shows a perspective view of the present invention with portions of the housing cut away to show the internal workings of the invention.

Referring now to the drawings, and in particular FIG. 1 and FIG. 2, the present invention is shown generally at 10 comprised of a rigid, substantially rectangular housing having a front wall 14, a rear wall (not shown), a pair of parallel sidewalls 16, a bottom wall 18, and a top wall 20, all of which may be made of metal or other suitable rigid material.

Mounted on top of the housing is an uncooked corn reservoir made of clear acrylic plastic or the like that retains the uncooked corn kernels 24. An access door 26 is disposed in the upper top of the uncooked corn reservoir 22 which allows access into the reservoir for adding more uncooked corn. The uncooked corn referred to are conventional uncooked popcorn kernels commonly available through grocery stores. Adjacent to the reservoir 22 are one or more cup holders 28 which may be circular recesses in the upper wall 20 for retaining a stack of cups 30, stacked on each other, in an inverted position. The front wall upper portion may contain a sign such as that shown in FIG. 1 or a marquis front face for decorative purposes.

The front face of the front wall 14 includes several important features. First, on the right hand lower side is an access chamber 32 which is for receipt of the cooked or popped corn. A cup 30 is placed, right side up, inside the access chamber at the time the machine is actuated. The bottom floor of the cooked corn access chamber 32 contains a turntable 34 having a skirt 34a that prevents popcorn from accumulating beneath the turntable which would prevent rotation. A motor (not shown) drives the turntable 34. A cup 30 placed on top of the turntable rotates when the machine is actuated.

An optional vending mechanism 36 is shown in the front wall 14 that receives coins. The mechanism may mechanically actuate the device by turning on electric power as well as activating other facets of the system described below. A front lockable access door 38 is shown that allows access to the interior of the machine for various purposes viz. to receive monies deposited from the vending actuator 36 or to gain access to at least one of the liquid flavoring reservoirs 66 mounted inside the device. These reservoirs are housed in special containers or jugs that need to be replaced periodically. Finally, the front wall 14 includes a de-actuating button 40 that allows the user to manually select and add a liquid flavoring to the corn after the corn cooking process. If the button 40 is closed the electric pumps which add flavoring are de-actuated and no liquid flavoring will be dispensed on the cooked popcorn. In the alternative embodiment, button 40 may be connected to activate the pumps so as to add flavoring when actuated.

FIG. 2 shows the device 10 partially cut away. A translucent acrylic uncooked kernel reservoir 22 is shown, having a cylindrical outlet tube 42, providing a bottom outlet for the corn to fall by gravity. The top access door 26 may be key actuated to provide access for adding more uncooked corn 24 to the uncooked corn reservoir 22. Two cup holders 28 are shown adjacent the uncooked corn reservoir 22, with inverted cups 30 used to receive the popped corn. Although an inverted cup dispenser is employed, a standard upright or side dispenser could also be used. The inverted dispenser insures only one cup is pulled from the dispenser per extraction.

The uncooked corn reservoir outlet 42 is contained in the bottom of the uncooked corn reservoir's bottom wall. The reservoir 22 has tapered wall surfaces so that all the uncooked corn will drop to the cylindrical outlet 42. The cylindrical outlet 42 is connected in a sealed manner to the corn dispenser and slide mechanism 44, which may be mechanically or electrically connected to the optional vending actuating device 36 mounted in the front wall 14 of the housing. Alternatively, a standard push-button switch may be used to electrically actuate the device without the use of coins, bills, or other monies. In this capacity, the machine operates merely to dispense popcorn and not as a vending machine.

Referring now to FIGS. 2–5, actuating device 36 has a mechanical arm 46 that is L-shaped which connects to an inside slide mechanism 50. Mechanism 50 includes an uncooked kernel measuring chamber 48 that is cylindrical and can slide from a first position (FIG. 3b) allowing uncooked kernels to be admitted by gravity from the uncooked popcorn kernel chamber 22 through the cylindrical outlet 42. The inside slide housing 50 slides to a second position (FIG. 4) where there is a lower circular aperture 52 which aligns with the uncooked kernel measuring chamber 48. The corn is then deposited by gravity into a chute 54 where it falls into the cooking chamber 60. The inside slide mechanism 50 is returned by mechanical spring or other electrical means to its original position as shown in FIG. 5B. The bottom wall 58, of the inside slide mechanism 50, isolates measuring chamber 48 from the outside atmosphere. Therefore, measuring chamber 48, which contains uncooked corn received from reservoir 22, is not exposed to ambient atmosphere. The top door 26 of the corn reservoir 22 is completely sealed and reservoir 22 is positioned so as not to be directly above the heat generated by the cooking chamber. Hence, the corn 24 is not subject to moisture loss or drying due to hot ambient air. This allows the corn to remain fresh for long periods of time.

Figure 3A:
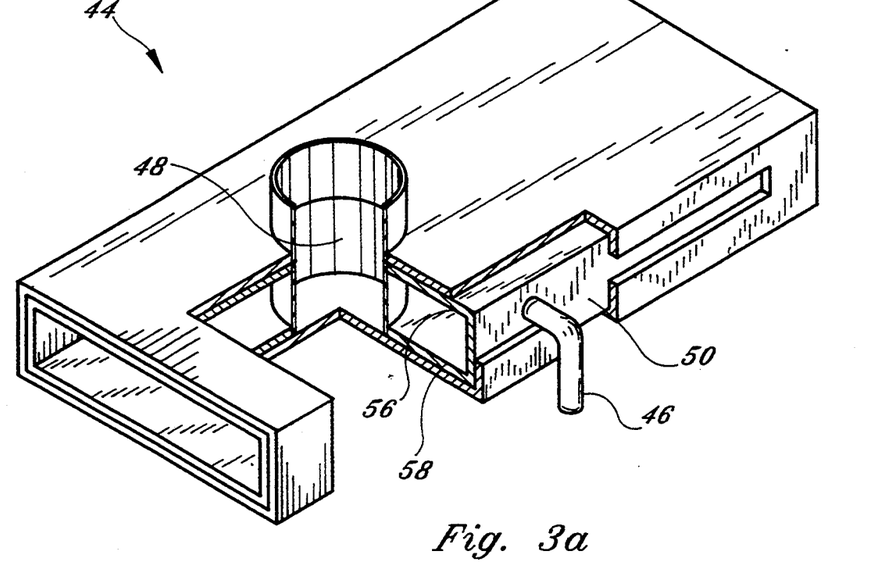
FIG. 3A shows a perspective view of the uncooked corn measuring and dispensing slide unit used with the present invention, partially cut away.
Figure 3B:
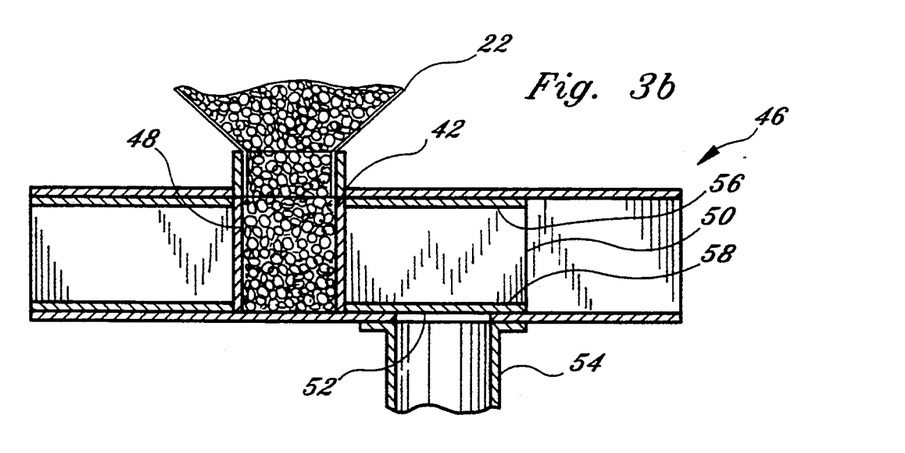
FIG. 3B shows a side elevational view in cross section of the uncooked corn dispensing and measuring device.
Figure 3C:
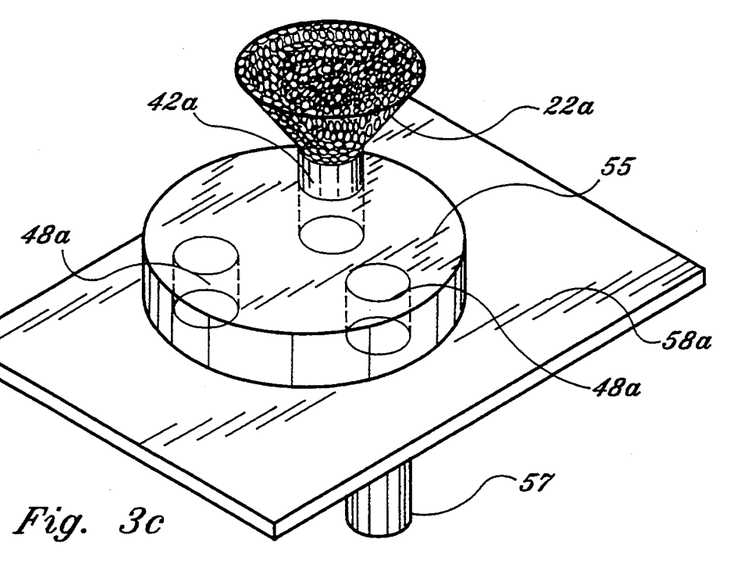
FIG. 3C shows a perspective view of an alternate uncooked corn transfer and measuring mechanism for use with the vending apparatus.

FIG. 3C shows an alternative embodiment of the uncooked corn measuring and dispensing mechanism. Uncooked corn reservoir 22a is connected by a collar 42a to an upper plate 55. Upper plate 55 has an aperture that allows access to the pre-measuring cylinder 48a containing the proper amount of corn. As the entire housing 59 is rotated, each of the opposed cylinder chambers 48a rotate so that the one adding the corn will move to a position near the corn chute 57. The corn chute has an aperture in plate 58a which allows the corn to fall into the cooker. The dispensing and measuring mechanism shown in FIG. 3C may be most desirable when used with fast action types of vending apparatus.

Figure 4:
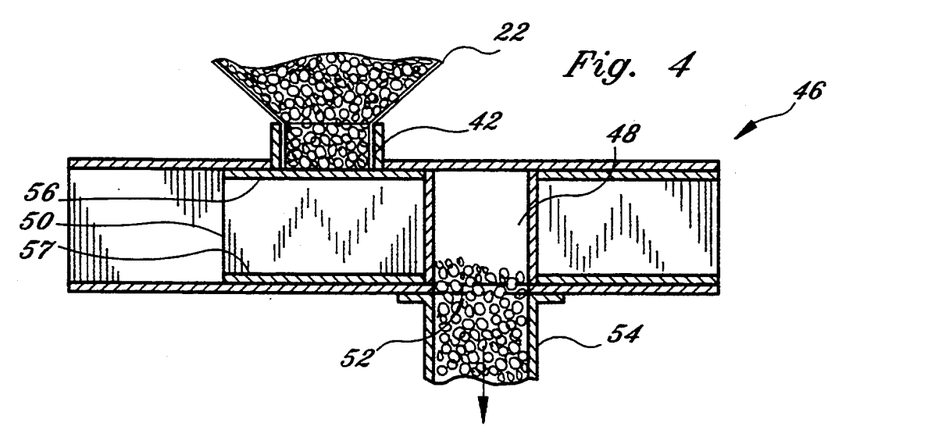
FIG. 4 shows a cross sectional view in elevation of the uncooked corn dispenser shown in FIG. 3B and the dispensing position where the uncooked corn is dispensed through the chute.

FIG. 4 shows how the inside slide mechanism 50 takes a prescribed amount of corn. The corn is metered out, by the volume of the cylindrical corn receiving chamber 48, when moved into the second position. The corn in the chamber 48 falls by gravity into the chute 54 where it is directed to the cooking chamber. Note in FIG. 4 that the upper inside slide wall 56 abruptly effaces the outlet 42 from the uncooked kernel reservoir 22, preventing additional corn from being dispensed. The corn is retained in position so that it is not exposed to outside air.

Figure 5:
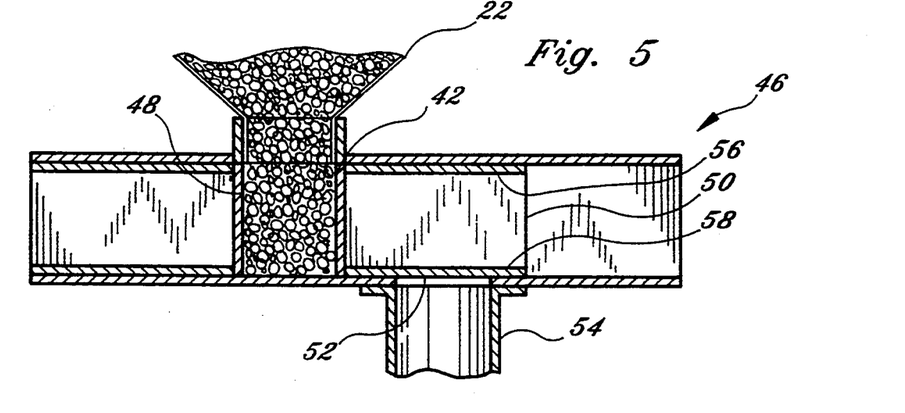
FIG. 5 shows a cross sectional view in elevation of the uncooked corn dispensing and measuring device in the return position after the uncooked corn has been dispensed and returned to the opening of the uncooked corn distributor.

Finally, in looking at FIG. 5, it can be seen that when the inside metering cylindrical chamber 48, measures out the uncooked corn, it returns to the original position, where it is aligned coaxially with the outlet 42 of the uncooked kernel reservoir 22. The chamber 48 is maintained in a position where outside air will not affect the uncooked corn. As noted above, uncooked popcorn can become stale and incapable for popping if moisture is allowed to leave the corn.

Figure 6A:
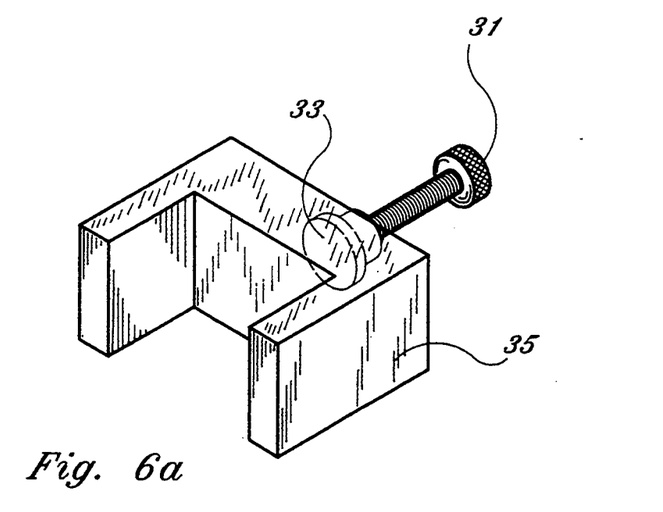
FIG. 6A shows a perspective view of an adjustable member for an alternative embodiment for the adjustable dispensing chamber.
Figure 6B:
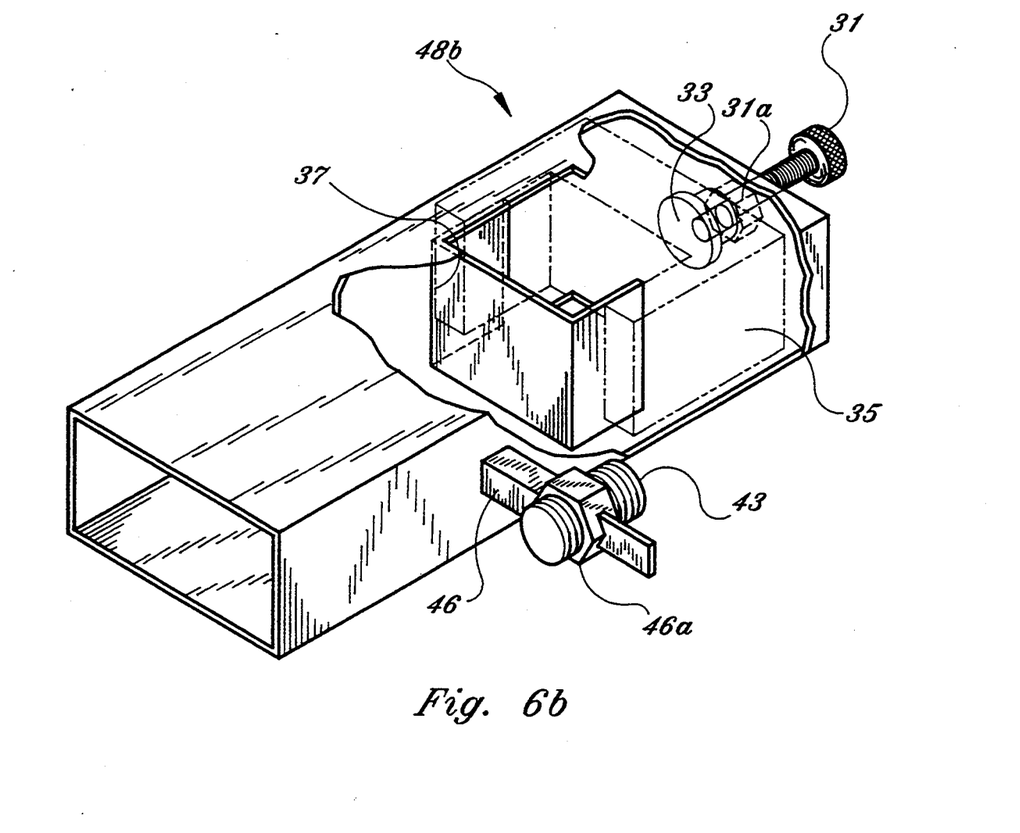
FIG. 6D shows a perspective view of the adjustable dispensing chamber used in an alternative embodiment.
Figure 7:
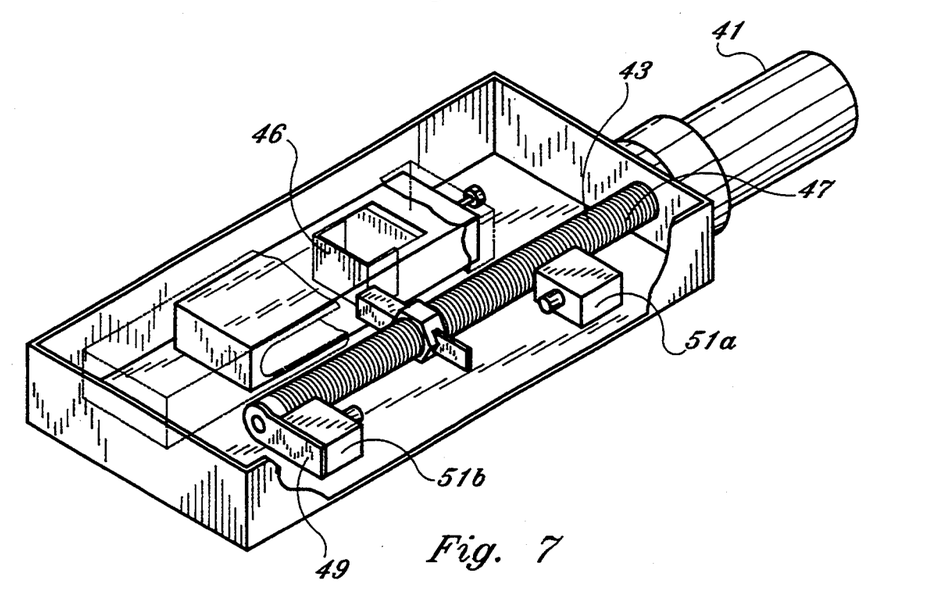
FIG. 7 shows a perspective view of the motorized drive screw mechanism.

FIGS. 6A and 6B show perspective use of the adjustable dispensing chamber used in an alternative embodiment of the invention. An adjustable set screw 31 works with nut 31a to move and adjust a stop 33 moving longitudinally within rear section 35 of the dispensing chamber. In this embodiment, the dispensing chamber 48b is square in shape contrary to the cylindrical chamber 48 disclosed above. The rear section 35 engages with front section 37 of the dispenser chamber 48a. Dispensing chamber 48a is slidably operated like the cylindrical chamber 48 above except in this configuration, stop 33 may be used to adjust the internal capacity of the chamber. As best seen in FIG. 7, a drive screw mechanism may be employed to mechanically move the chamber 48b in a longitudinal motion.

In yet another embodiment, mechanical arm 46 may be operated by the drive screw mechanism shown in FIG. 7. Specifically, a motor 41 is attached to an elongated screw member 43. Screw member 43 is threaded and rotates clockwise or counterclockwise, depending on the direction of the motor. The screw member 43 passes through drive housing 45 at a first point 47 and is secured to the housing at a second point 49. Mechanical arm 46 attaches to screw member 43 with a bolt 46a which corresponds with the threading of screw member 43. As the screw member rotates clockwise or counterclockwise, the mechanical arm 46 moves with the screw member 43 as the mechanical arm moves longitudinally through the slot 46s. (Note FIG. 2). A series of micro switches 51a, 51b are used to determine stopping points of mechanical arm 46 which an electrical circuit detects to stop rotation of the motor 41.

Figure 8:
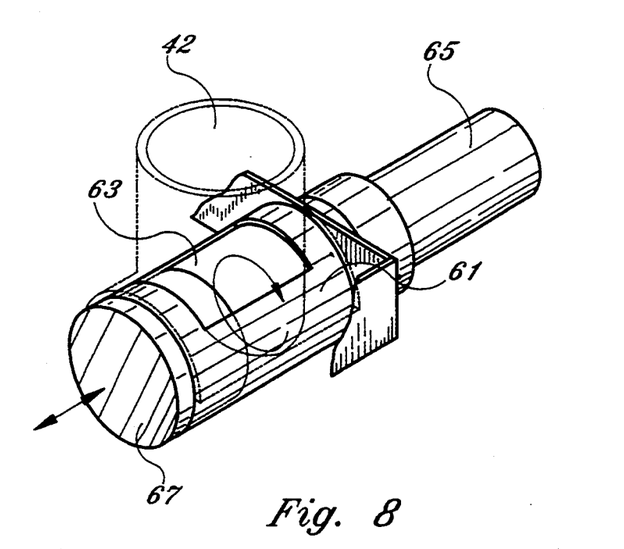
FIG. 8 shows a perspective view of the cylindrical transfer mechanism.

In still yet another embodiment, a transfer cylinder arrangement may be used a shown in FIG. 8. In this configuration, the uncooked corn reservoir 22a is placed directly above a cylinder housing 61. A semi-cylindrical receptacle 63 is placed within cylinder housing 61. Receptacle 63 rotates, as indicated by the arrow, within the housing 61 to dump or release corn. Corn fills the receptacle through cylindrical outlet 42. It is released through a hole or bore (not shown) at the lower portion of housing 61. A motor 65 rotates the receptacle 63. An adjustable stop 67 may also be used within the interior volume to reduce the interior capacity the receptacle 63. This feature can be used to regulate the amount of corn entering the receptacle 63 which is subsequently dumped into the cooking chamber.

Referring back to FIG. 2, other features of the invention are also shown. The cooking unit 60 includes a heated cooking chamber 62 that uses an electrical source to heat a metal surface or coils which heat the kernels to a popping temperature. Due to the moisture in the kernel, high heat converts this moisture to steam. This causes the kernel to explode and move violently upward by an airstream produced by an internal blower. A deflecting portion 64 directs the popped corn down an incline slope where it falls into the cup receiving chamber 32. The cup receiving chamber 32, is mounted with the housing and includes a front opening in the front wall 14. A door (not shown), covering the front area of the chamber, may be used to avoid spillage. This door may also be used when the device is inoperative for long periods of time.

Once access is obtained to the cup receiving chamber 32, a cup 30 is placed on the turntable 34. A start switch (not shown) or optional vending mechanism 36 is actuated. Heating elements (not shown) in the cooking unit 60 are actuated and uncooked corn is fed to the cooker 60. Cooking time is preset by an internal timer at approximately two minutes. In an alternative embodiment, the cooking time may be selected by a potentiometer or switch, attached to the internal timer, which is affixed to the housing. This would allow to pre-select the cooking time while servicing a vendor machine.

Once cooked, the popcorn is carried by an air current, generated by an internal fan (not shown), into the cup. Additionally, any popcorn which may miss the cup and spills over the side may be caught in an optional container in the form of a drawer 71. The drawer 71 is simple in construction, and is built into the lower portion of bottom wall 18. The drawer may be opened at the option of the user to catch or trap excess waste falling from the cup.

The invention discloses a reservoir 66 that may include one or more liquid flavorings, such as liquid cheese. The reservoir 66 is connected to a peristaltic pump 68 by inlet tube 74. An outlet tube 70 dispenses liquid flavoring into a location a the top of the cup receiving chamber 32. The turntable 34, supporting the cup, is rotated by a small electric motor (not shown) underneath the turntable 34. As long as the manually de-actuation button 40 on the front wall 14 of the device has not been activated, the pump 68 will be automatically turned on, causing liquid to move through the pump 68. The liquid is distributed at points onto the top of the popcorn. Rotation of the cup 30 allows for even distribution of liquid cheese or other flavoring as desired. It may prevent the customer from prematurely removing the cup before the flavoring is dispensed.

A front access door 38 is shown partially in FIG. 2 in an open position with a compartment 72 for receiving monies form the optional vending actuating mechanism 66.

A power cord 76 is used to provide power to the unit and a series of timing an control circuit elements 78. Timing and control circuits 78 provide power to the cooking unit 60, pump 68, turntable 34. All these components are actuated by the timing mechanism. Each may have independent cycle times, depending on how the machine is operated. As indicated above, the uncooked corn dispensing unit may vary in configuration and may be mechanically or electrically operated.

The primary advantage of the present invention resides in its ability to maintain uncooked popcorn kernels fresh and moist in view of the unique storage facility. The various mechanisms used for dispensing the corn protects the corn from the damaging effects of ambient air. Hot dry air eventually allows corn to dry out. If the corn is moisture free it will not pop. This is critical to a successful long-term dispensing operation where popcorn may be left unattended, for days or weeks before being consumed. Obviously, if the popcorn is not fresh, then the purpose of the fresh popcorn machine is defeated completely.

Secondly, a very important feature of the invention is that it allows the user of the machine an option of putting a liquid flavoring, such as liquid cheese, directly on top of the popcorn. This is accomplished at the moment of cooking so that both the resultant popcorn and liquid topping are fresh and warm. In an additional embodiment, the invention allows small portions of the flavoring or topping to be dispensed at times during the dispensing of the popped corn into the cup 30. This allows for a more even distribution of flavoring throughout the popcorn, rather than dispensing the flavoring all at once, at the end of the cooking period. Further, the liquid topping is kept in a preserved state. A sealed dispensing unit and reservoir connect to the pump such that all of the liquid flavoring is evenly dispensed from the pump and its outlet tube, during each dispensing cycle.

To operate the device as shown in FIG. 2, the user would select a cup 30. It is placed in the cup receiving chamber 32 on top of the turntable 34. The user would mechanically or electrically actuate the dispensing mechanism. If the optional vending mechanism 36 is used, the appropriate amount of coins or paper money are inserted to actuate the dispensing mechanism. This provides power to the cooking unit 60 as well as the various timing circuits, turntable 34 and the liquid cheese pump 68. The dispensing mechanism is comprised of the inside slide mechanism 50, which manually or electrically triggers a metered amount of uncooked corn. The corn is transferred to the chute 54 where it drops into the cooking device 60. The slide 50 returns to its initial position, protecting the remaining uncooked corn from exposure to the atmosphere. When the timing circuits 78 are actuated, the cooking begins and the popcorn is cooked, typically with a hot air source. The turntable 34 begins rotating. If the user does not desire the liquid cheese or other flavorings from being dispensed, the manual button 40 may be pushed on the front wall 14. If the button is not pushed, the liquid flavoring is automatically dispensed on top of the corn while rotated by the turntable. The user then removes the cup at the end of this cycle with hot popcorn and uniformly distributed flavoring. If multiple flavorings are used, two or more buttons must be used and set up to select a desired flavor when activated.

A vendor operator can service the device 10 by adding more uncooked corn 24 to the uncooked corn reservoir through the top access door 26 by a key. The vending operator also will have access through the front door 38 using a key to remove monies received or to add more liquid flavoring by replacing the internal reservoirs therein.

One or more exhaust fans may be mounted inside the housing to expel heat and provide the cooked popcorn aroma into the ambient environment.

As shown, the unit is quite compact, provides for extremely fresh popcorn at all times, and provides for quickly and readily dispensed fresh popcorn with a liquid flavoring if desired. Because of the small size of the unit, it can be utilized on a countertop or other convenient location where it can be left unattended for simple operation by the user.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A popcorn dispensing machine for cooking fresh popcorn comprising:
   a corn kernel reservoir for holding corn kernels;
   metering means located below said corn kernel reservoir for transferring a predetermined number of kernels from said reservoir;
   cooking means for popping said corn kernels received from said metering means;
   a receiving chamber for housing a cup used to receive popped kernels, said chamber including a turntable rotatably mounted therein to rotate said cup in a circular motion; and
   flavoring means for distributing at least one liquid flavoring across said popped kernels while said kernels are in said cup.

2. The machine according to claim 1, wherein said receiving chamber further includes a waste receptacle to catch said popped kernels which are not retained by said receiving chamber.

3. The machine according to claim 2, wherein said waste receptacle is a pull-out drawer.

4. The machine according to claim 1, wherein said machine further includes timing means for timing the operation of both said cooking means and said turntable.

5. The machine according to claim 1, wherein said flavoring means includes at least one liquid flavor reservoir for storing said liquid flavor, and at least one pump for pumping said liquid flavor from said at least one flavor reservoir to said popped kernels.

6. The machine according to claim 1, wherein said metering means includes a first chamber, movable between first and second positions, for gathering said corn kernels from said reservoir in said first position and releasing said corn kernels into said cooking means at said second position.

7. The machine according to claim 6, wherein said chamber is substantially cylindrical in shape and is movable to said first and second positions within a housing, said housing including a top wall, bottom wall, and side walls, wherein said top wall includes an intake aperture for filling said chamber with corn kernels from said reservoir, and said bottom wall includes an outlet aperture for releasing said kernels into said cooking means.

8. The machine according to claim 7, further including a chute for directing said kernels from said outlet aperture to said cooking means.

9. The machine according to claim 6, further including a drive means for moving said chamber, said drive means including a motor and drive member for shifting a control arm, attached to said chamber, between said first and second positions.

10. The machine according to claim 6, wherein said metering means includes a second chamber, both said first and second chambers being loaded with corn kernels from said reservoir while in said first position and revolve in a circular motion to unload each of said first and second chambers when each respective chamber is moved into said second position.

11. The machine according to claim 6, wherein said first chamber is semi-cylindrical in shape and is rotatably positioned within a second chamber, said second chamber including an aperture at its upper and lower ends, for allowing corn kernels
   from said reservoir to fill said first chamber in said first position and empty from said chamber in said second position.

12. The machine according to claim 11, wherein said first chamber is moved from said first position to said second position by a motor attached to said first chamber by rotating said first chamber within said second chamber.

* * * * *